United States Patent
Zhang et al.

(10) Patent No.: US 9,286,651 B2
(45) Date of Patent: Mar. 15, 2016

(54) AIRCRAFT-BASED INFRARED IMAGE RECOGNITION DEVICE FOR GROUND MOVING TARGET

(71) Applicant: Huazhong University of Science and Technology, Wuhan (CN)

(72) Inventors: Tianxu Zhang, Wuhan (CN); Shiying Gao, Wuhan (CN); Yuehuan Wang, Wuhan (CN); Sheng Zhong, Wuhan (CN); Luxin Yan, Wuhan (CN); Pengxian Yu, Wuhan (CN); Bin Lu, Wuhan (CN); Hao Li, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 14/693,847

(22) Filed: Apr. 22, 2015

(65) Prior Publication Data

US 2015/0227776 A1    Aug. 13, 2015

Related U.S. Application Data

(63) Continuation-in-part of application No. PCT/CN2014/085709, filed on Sep. 2, 2014.

(30) Foreign Application Priority Data

Sep. 30, 2013    (CN) .......................... 2013 1 0462581

(51) Int. Cl.
| | |
|---|---|
| *G06K 9/00* | (2006.01) |
| *G06T 3/00* | (2006.01) |
| *G06T 3/60* | (2006.01) |
| *H04N 5/33* | (2006.01) |

(52) U.S. Cl.
CPC .......... *G06T 3/0068* (2013.01); *G06K 9/00624* (2013.01); *G06K 9/00986* (2013.01); *G06T 3/60* (2013.01); *H04N 5/33* (2013.01); *G06T 2207/10016* (2013.01)

(58) Field of Classification Search
None
See application file for complete search history.

(56) References Cited

U.S. PATENT DOCUMENTS

| 7,663,502 | B2 * | 2/2010 | Breed | B60C 11/24 340/12.25 |
|---|---|---|---|---|
| 2007/0014488 | A1 * | 1/2007 | Chen | G06K 9/0063 382/294 |
| 2007/0253623 | A1 * | 11/2007 | Ohira | G06K 9/4638 382/218 |
| 2011/0034176 | A1 * | 2/2011 | Lord | G06F 17/30244 455/450 |
| 2011/0169943 | A1 * | 7/2011 | Bachman, II | G06K 9/209 348/117 |
| 2011/0280453 | A1 * | 11/2011 | Chen | G06T 7/0046 382/113 |
| 2012/0106847 | A1 * | 5/2012 | Qi | G06K 9/6247 382/195 |

(Continued)

*Primary Examiner* — Shervin Nakhjavan
(74) *Attorney, Agent, or Firm* — Matthias Scholl, PC; Matthias Scholl

(57) ABSTRACT

An aircraft-based infrared image recognition device for a ground moving target, including an infrared non-uniformity correction module, an image rotation module, an image registration module, a multi-level filtering module, a connected domain labeling module, a target detection and feature recognition module, a process control module, and a FPGA-based interconnection module. The invention uses an ASIC/SoC chip for image processing and target recognition, the DSP processor and the FPGA processor, it is possible to enable a multi-level image processing and target recognition algorithm, to improve system parallel, and to facilitate an aircraft-based infrared image recognition method for a ground moving target. Meanwhile, embodiments of the invention effectively reduce power consumption of the device.

3 Claims, 10 Drawing Sheets

(56) References Cited

U.S. PATENT DOCUMENTS

| | | | |
|---|---|---|---|
| 2013/0083312 A1* | 4/2013 | Baraniuk | G01J 3/2823 356/51 |
| 2014/0139643 A1* | 5/2014 | Hogasten | H01L 27/14609 348/48 |
| 2015/0310603 A1* | 10/2015 | Moraites | H04N 5/23296 348/144 |

* cited by examiner

AIRCRAFT-BASED INFRARED IMAGE RECOGNITION DEVICE FOR GROUND MOVING TARGET

CROSS-REFERENCE TO RELATED APPLICATIONS

This application is a continuation-in-part of International Patent Application No. PCT/CN2014/085709 with an international filing date of Sep. 2, 2014, designating the United States, now pending, and further claims priority benefits to Chinese Patent Application No. 201310462581.6 filed Sep. 30, 2013. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The invention relates an aircraft-based infrared image recognition device for a ground moving target.

2. Description of the Related Art

An aircraft is a fast moving platform. Its movement ("platform movement") causes a rapid change of the terrain ("background image") its capturing equipment can detect. When an aircraft tracks a target ("foreground image"), background variation is due to both, the platform movement and the foreground image movement.

There are two basic types of algorithms for separating background variation into these two components. The first type is static-platform-based target detection and tracing algorithm; the second type is moving-platform-based target detection and tracing algorithm. Compared with the static-platform-based target detection and tracing algorithm, the moving-platform-based target detection and tracing algorithm is much more complex.

A scale-invariant feature transform (SIFT) algorithm is a classical and effective image registration algorithm that can be used for distinguishing foreground movement from background movement. However, the algorithm features heavy computation burden, which makes it difficult to enable real-time registration as it is executed on a single digital signal processor (DSP). In addition, detection and tracing of a ground target may face certain problems like complex background, interference (such as shielding) and so on.

Automatic target recognition of an infrared image of an aircraft is a process in which an imaging platform moves from far to near with respect to a target. A long-distance target is mainly a point target with little information. A medium-distance target is mainly a speckle target, and a size, a shape and grayscale distribution of an image can be utilized. For a comparatively short-distance target (which represents an area target), very detailed feature information (comprising rich shape and texture features) can be obtained and used for recognition classification. Correspondingly, target feature models and target recognition algorithms reflect characteristics of multi-level and multi-dimension. Therefore, feature space for feature extraction and mapping and target representation should be graded for adequate target information mining at different phases. However, common recognition algorithms cannot handle the searching, detection, and recognition processes, and multi-state recognition processes under long-distance, medium-distance and short-distance imaging have been developed, so that a processing system is capable of correctly detecting, tracing and recognizing a target. This further increases workload of the system, as shown in FIG. 1.

(1) Long-distance imaging: normally at the beginning of target recognition, a scene is obtained at a comparatively far height or distance so that a resulting view field is much wider, and a target is a small point target with no shape. By employing algorithms such as a matched filtering algorithm, a multistage filtering algorithm and so on, it is possible to suppress interference of background and noise in two-dimensional space or three-dimensional time-space space and highlight the target, thereby capturing the target.

(2) Medium-distance imaging: the aircraft may approach the target and enters a tracing phase after capturing the target. During the tracing phase, a window can be properly set for relieving computation burden. At this time, the target is a speckle target with certain shape information. To distinguish background movement from foreground movement, a SIFT operator is used for feature extraction and image registration. Then a multi-level filter is used for highlighting the target and suppressing background clutter.

(3) Short-distance imaging: as the aircraft continues approaching the target, the target as an area target indicates more feature information regarding profile and texture. At this time, a connected domain labeling and profile tracing algorithm can be used for tracing the target, and the SIFT operator can be used for extracting feature, thereby enabling image registration, mapping and recognition of the texture of the target, and finally recognition of the target.

A conventional aircraft-based system for processing an infrared image normally is limited by volume, weight, power consumption, and so on, and meanwhile, the processing algorithm is comparatively complex. Therefore, a parallel processor with high computing capability and flexibility needs to be designed for ensuring real-time performance during computation. Thus, there are several requirements for the processor:

(1) real-time performance: only real-time target recognition can ensure accurate tracing and positioning of a target during movement of an aircraft as a platform, since target recognition of the aircraft aims to guide the aircraft to detect and trace the target, and the aircraft normally features a comparatively high flight speed;

(2) size reduction: size reduction trend of an aircraft requires an infrared image processing system has smaller size and the same or even more functions as compared with a conventional system;

(3) low power consumption: size reduction of an aircraft may cause a problem of heat dissipation; in this scenario, an infrared image processing system with low power consumption has to be designed to address the problem thereby ensuring reliability of the system in operation.

A conventional infrared image processing system mainly employs a structure combining a DSP with a field programmable gate array (FPGA), or that combining multiple DSPs and FPGAs. However, this kind of isomorphic structure has some disadvantages such as high power consumption and low efficiency, moreover, a bottleneck problem in terms of optimization of image processing and target recognition exists in the DSP processor due to its generality.

SUMMARY OF THE INVENTION

In view of the above-mentioned problems, it is an objective of the invention to provide an aircraft-based infrared image recognition device for a ground moving target for addressing problems with a conventional recognition device in terms of power consumption and real-time performance upon recognizing ground moving targets in a moving platform imaging condition.

To achieve the above objective, in accordance with one embodiment of the invention, there is provided an aircraft-based infrared image recognition device for a ground moving target, comprising an infrared non-uniformity correction SoC chip, an image rotation ASIC chip, a multi-level filtering ASIC chip, a connected domain labeling and profile tracing ASIC chip, a main DSP processor, an auxiliary DSP processor, a main FPGA processor, and an auxiliary FPGA processor, wherein the main DSP processor operates to control whole target detection and recognition, to enable target detection and feature recognition, to communicate with external interfaces, to receive imaging parameters from an aircraft, and to output results of detection, tracing and recognition;

the auxiliary DSP processor operates to enable SIFT feature extraction and image registration with the auxiliary FPGA processor, comprising calculating a keypoint descriptor and image registration, and transmitting a keypoint descriptor vector (namely a SIFT feature that is obtained) to the main DSP processor as a target feature for target recognition;

the main FPGA processor operates to form data transmission channels for each ASIC/SoC chip, the main DSP processor and the auxiliary FPGA processor, to conduct image pretreatment comprising perspective transformation and window setting, and to assist the main DSP processor in controlling each ASIC/SoC chip;

the auxiliary FPGA processor operates to enable SIFT feature extraction and image registration with the auxiliary DSP processor, comprising scale space extrema detection, keypoint positioning, and orientation determination;

the infrared non-uniformity correction SoC chip comprises an embedded CPU and a correction ASIC core, the embedded CPU operates to enable calibration and updating of gain calibration parameters, and the correction ASIC core operates to enable real-time correction;

the image rotation ASIC chip operates to transform two-dimensional rotation into three-time one-dimensional translation, and to enable image rotation via a cubic convolution interpolation (namely bicubic interpolation) algorithm;

the multi-level filtering ASIC chip operates to provide a band-pass filter for suppress background and noise based on spectral analysis on small targets, background and noise, and to adjust a bandwidth of the filter via a cascaded filtering module based on a multilevel filter algorithm thereby extracting targets with different size in case that the targets exist; and the connected domain labeling and profile tracing ASIC chip operates to uniformly and uniquely label connected pixels having the same gray value in an input multi-level segmented image, based on an eight-neighborhood relationship, with natural numbers in an appearance order of the connected domain in the image from the left to the right, and from the top to the bottom, and to output a labeled image.

Advantages according to embodiments of the invention are summarized as follows. By using the special ASIC/SoC chip for image processing and target recognition, the DSP processor and the FPGA processor, it is possible to enable a multi-level image processing and target recognition algorithm, to improve system parallel, and to facilitate an aircraft-based infrared image recognition method for a ground moving target. Meanwhile, low power consumption of the special ASIC/SoC chip for image processing and target recognition enables power consumption of the device to meet power and design requirement.

DETAILED DESCRIPTION OF THE EMBODIMENTS

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

Figure 1:
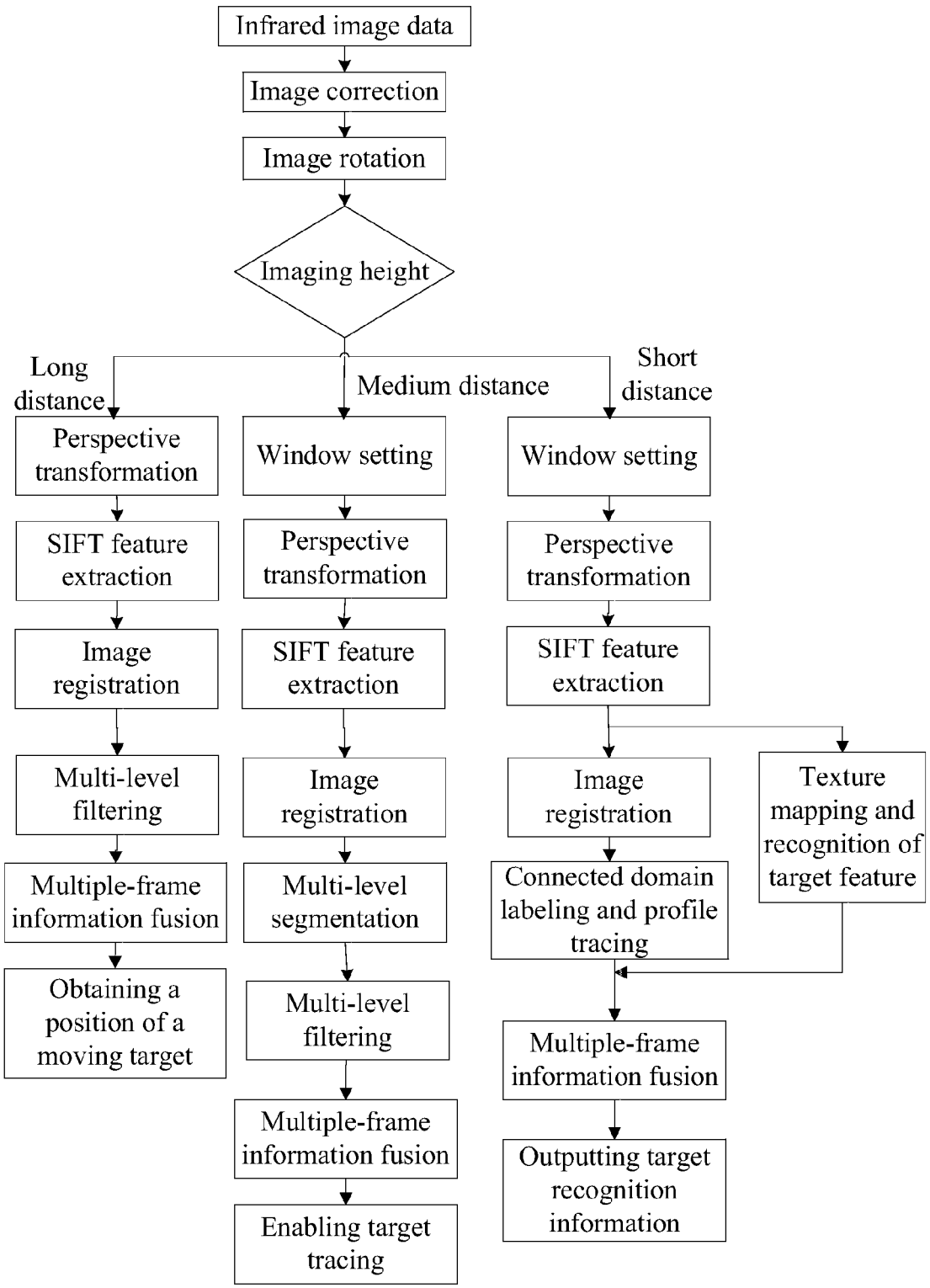
FIG. 1 illustrates a general process for aircraft-based recognition for a ground moving target.
Figure 2:
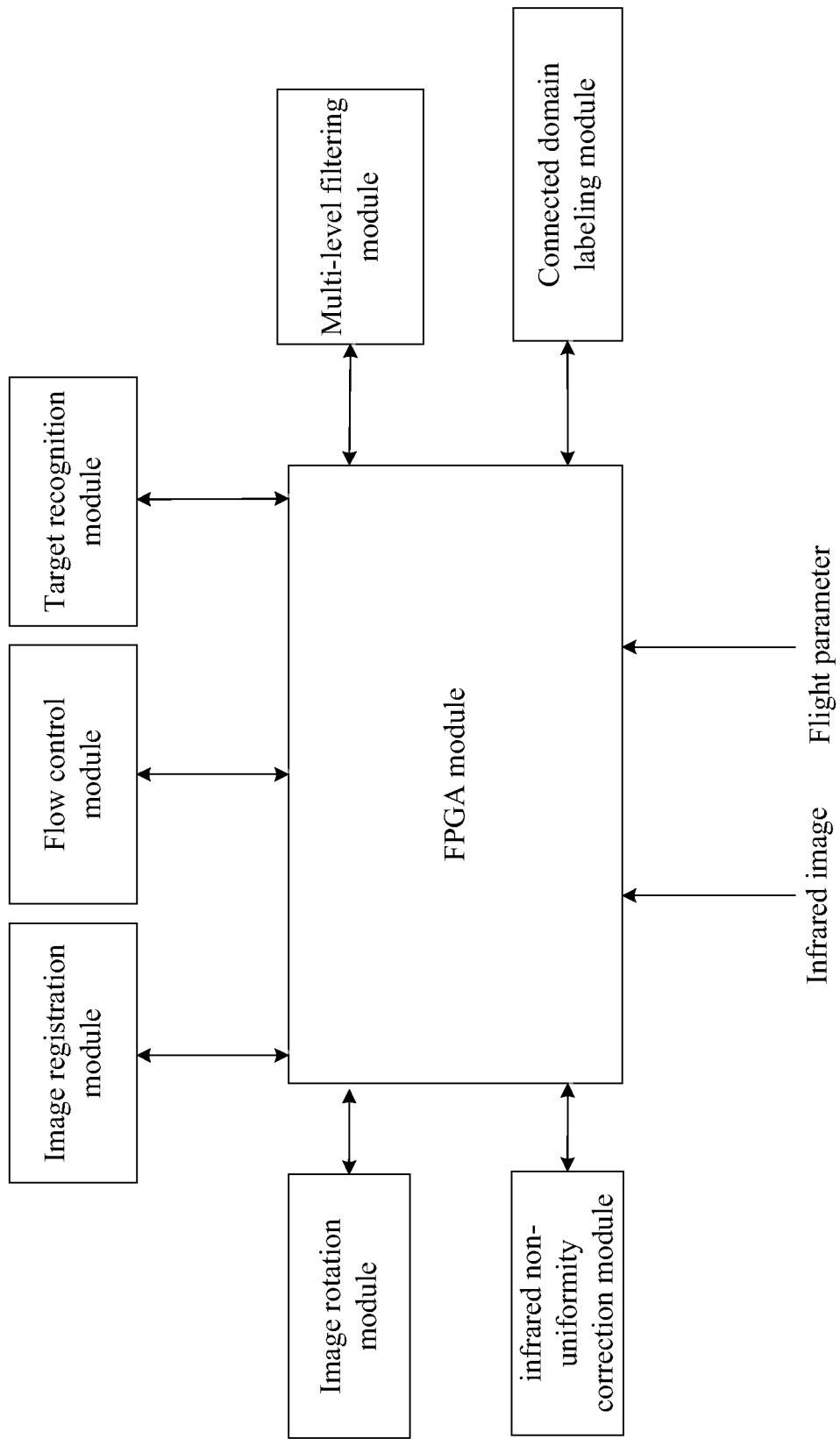
FIG. 2 is a block diagram of an aircraft-based infrared image recognition device for a ground moving target of an exemplary embodiment of the invention.

As shown in FIG. 2, an aircraft-based infrared image recognition device for a ground moving target functionally comprises an infrared non-uniformity correction module, an image rotation module, an image registration module, a multi-level filtering module, a connected domain labeling module, a target detection and feature recognition module, a process control module, and an FPGA-based interconnection module.

The infrared non-uniformity correction module receives image information input from an infrared imaging focal plane, and conducts real-time correction on non-uniformity of the infrared imaging focal plane via a motion-detection-based adaptive correction algorithm. The motion-detection-based adaptive correction algorithm comprises four processes: pretreatment correction, real-time correction, adjustment of an iteration step size, and updating of a gain calibration coefficient.

(1) A pretreatment correction process: it is required to determine a position of a non-effective pixel during detection thereof. For a fixed non-effective pixel, a position thereof can be determined by conducting detection in a lab. However, due to charge readout and channel disorder that may cause a cell signal to attenuate or enhance thereby representing the non-effective pixel during imaging, the non-effective pixel has random and shifting feature, and it is impossible to determine the position thereof in the lab since it varies along with time. Therefore, a dynamic scene-based detection method has to be introduced. A scene-based adaptive calibration algorithm is a kind of dynamic detection method that is capable of dynamically updating a background frame and a bad pixel template for real-time correction.

(2) A real-time correction process: an effective pixel and a non-effective pixel are processed under guidance of a bad pixel template. Normally, spatial interpolations output by adjacent effective pixels are used to replace the non-effective pixel, and then a background frame and a gain calibration coefficient obtained from a previous frame of image are used for real-time correction thereby obtaining a corrected image.

(3) An adjustment process of an iteration step size: motion information is used to guide an iteration process of the gain calibration coefficient, where a motion variance of a scene is used as information that is proportional to an iteration step of the gain calibration coefficient, as the scene moves quickly, the iteration step is increased, as the scene moves slowly, the iteration step is reduced, thereby adaptively controlling an updating speed of the calibration coefficient.

(4) An updating process of the gain calibration coefficient: the motion information and a steepest descent method are combined for updating the gain calibration coefficient, and thereby enabling real-time updating thereof.

The image rotation module receives an image that is non-uniformly corrected, and conducts rotation transformation on the image via a three-step image translation and rotation algorithm according to a flight parameter of an aircraft. The three-step image translation and rotation algorithm is to transform two-dimensional image rotation transformation into three-time one-dimensional image translation. Normally, a pixel point that is rotated is not located on a whole pixel point of an original image, and therefore the image rotation module uses a bicubic interpolation algorithm to calculate a pixel value after rotation.

The image registration module conducts image registration via a SIFT feature, so as to eliminate background motion during imaging of a moving platform due to movement of an imager, and to make it possible to apply an extracted feature to a target recognition algorithm. The image registration mainly comprises five steps: (1) scale space extrema detection: to detect potential interest points that are invariant to scale and selection on scale space via a Gaussian derivation function; (2) keypoint positioning: to determine a position and scale of a keypoint at the interest point; (3) orientation determination: to allocation a direction to each keypoint based on a local gradient direction of an image; (4) keypoint descriptor: to measure a local gradient of the image in each neighborhood of each keypoint, and finally to describe the local gradient via a feature vector; (5) image registration: to determine a relationship between keypoint descriptors in two frames of an image according to a minimum wrong decision probability rule, and to conduct registration of the image under guidance of the relationship.

The multi-level filtering module detects a point target under long-distance imaging, and a speckle target under medium-distance imaging. A multi-level filtering algorithm constructs a band-pass filter according to frequency-domain characteristics of small targets, background and noise, namely background energy is mainly concentrated in a low-frequency band, and target energy is mainly concentrated in a medium-frequency band, and noise is mainly concentrated in a high-frequency band, suppress background and noise, and highlight a target thereby improving a signal-noise-ratio. Moreover, to detect small targets with different sizes, multiple filtering modules are cascaded thereby enabling adjustment of a bandwidth of a filter.

The connected domain labeling module conducts connected domain labeling on an image obtained by multi-level segmentation via a multi-level image connected domain labeling algorithm in a short-distance imaging condition, calculates a connected domain area, a sum of row coordinates of pixels in a connected domain, and a sum of column coordinates of pixels in the connected domain, and detects a coordinate of a starting point of a profile of the connected domain. The sum of both the row coordinates and the column coordinates of the pixels in the connected domain can be used for calculating a gravity center of the connected domain, and the coordinate of the starting point of the profile of the connected domain indicates a starting point of a profile tracing algorithm for accelerating a running process thereof. The multi-level image connected domain labeling algorithm comprises steps: (1) initial labeling of an image: to allocate a temporary label to each pixel, and to record an equivalence relationship of the temporary label in an equivalence table; (2) arranging the equivalence table: to enable all temporary labels with equivalence relationship to be equivalent to a minimum thereof, to sequentially renumber the connected domain with natural numbers (the numbers being used as final labels), and to save equivalence relationship between the temporary labels and the final labels; (3) image substitution: to substitute the image pixel by pixel, and to replace the temporary label with the final label.

The target detection and feature recognition module conducts binary segmentation on the image obtained by the multi-level filtering module so as to obtain a target position, determines credibility of the target position based on detection results of multiple frames of image therebefore or thereafter so as to increase credibility of the target position, and eliminates 'false alarm' caused by noise interference under the long-distance imaging condition. The module conducts binary segmentation on the image obtained by the multi-level filtering module so as to obtain a target position and size of each target domain, and restricts target tracing according to the target position and the size so as to obtain relationship between targets in multiple frames of image and enable target tracing in a medium-distance imaging condition. The module calculates a length-width-ratio and profile of a target according to a connected domain labeling result and the connected domain area obtained by the connected domain labeling module, compares them with a length-width-ratio and profile of a target template to be recognized so as to determine whether the target is a target to be recognized, calculates a similarity between a SIFT feature obtained by the image registration module and that of the target module, and uses the profile of the target and the SIFT feature to improve credibility of a recognition result thereby outputting a recognition result under short-distance imaging.

The process control module: process control module controls operation orders of all modules and data transfer therebetween, and manages switching between different algorithm flows under different imaging distances, so that all modules can enable target detection, tracing and recognition in a cooperative and ordered manner.

The FPGA-based interconnection module provides data channels between different modules, and effectively solves an interconnection problem caused by different data widths, data rates and interfaces. Meanwhile, the module assists the process control module to control all modules via a state machine, so that all the modules can process an image in a cooperative and ordered manner.

Figure 3:
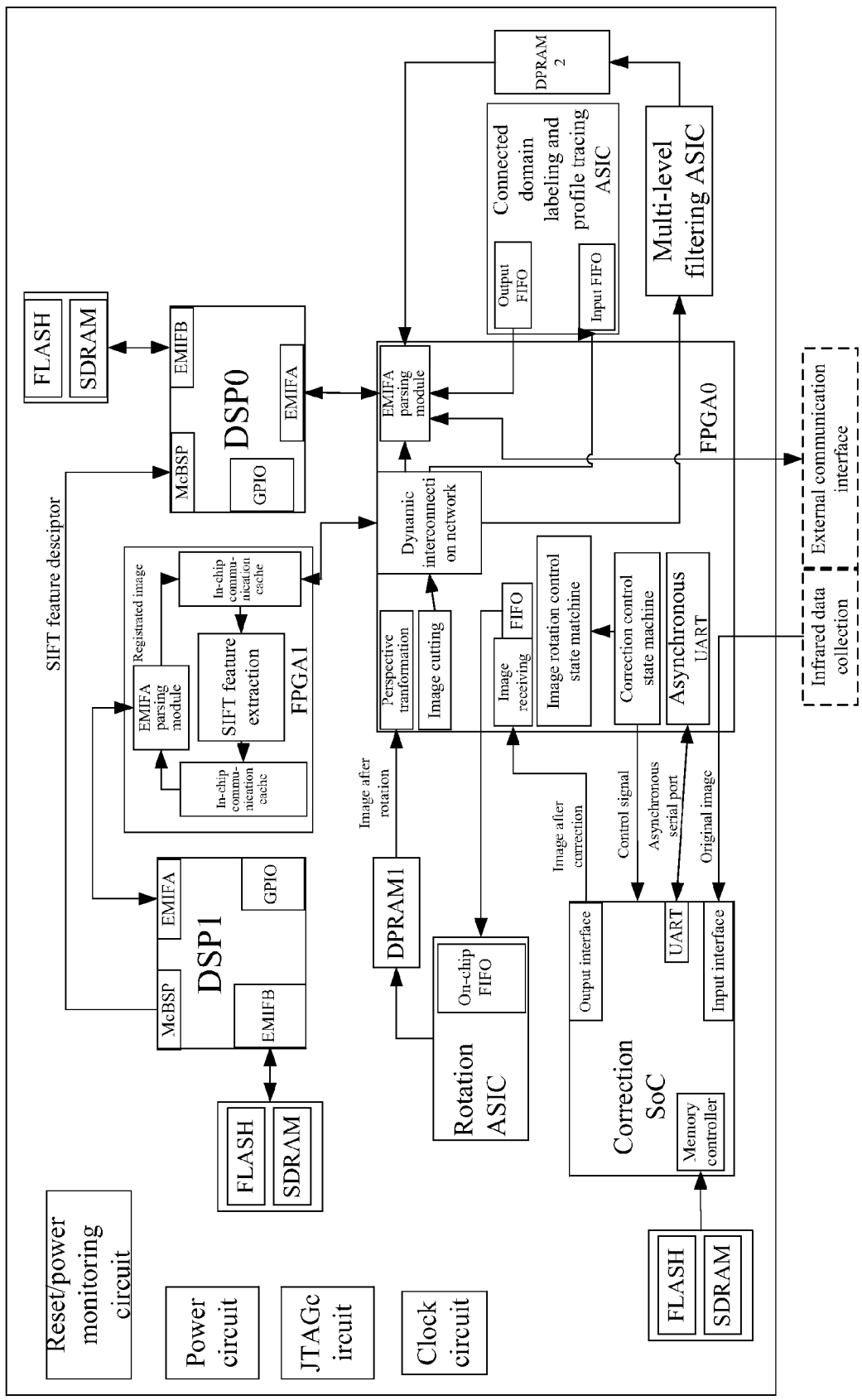
FIG. 3 illustrates hardware structure of the aircraft-based infrared image recognition device for a ground moving target.

As shown in FIG. 3, the aircraft-based infrared image recognition device for a ground moving target in hardware employs an architecture of 'ASICs/SoCs+FPGAs+DSPs', where processing chips comprise an infrared non-uniformity correction SoC chip, an image rotation ASIC chip, a multi-level filtering ASIC chip, a connected domain labeling and profile tracing ASIC chip, a main DSP processor DSP0, an auxiliary DSP processor DSP1, a main FPGA processor FPGA0, and an auxiliary FPGA processor FPGA1.

Functions of each chip are as follows:

1. The main DSP processor DSP0 operates to: (1) control flow of a target detection and recognition algorithm so that all modules can enable flow control in a cooperative and ordered manner, (2) enable detection, tracing and recognition of the target, and make fusion decision on results of multiple frames thereby enabling target detection and feature recognition, (3) communicate with external interfaces for receiving imaging parameters of an aircraft, and output results of detection, tracing and recognition.

Figure 8:
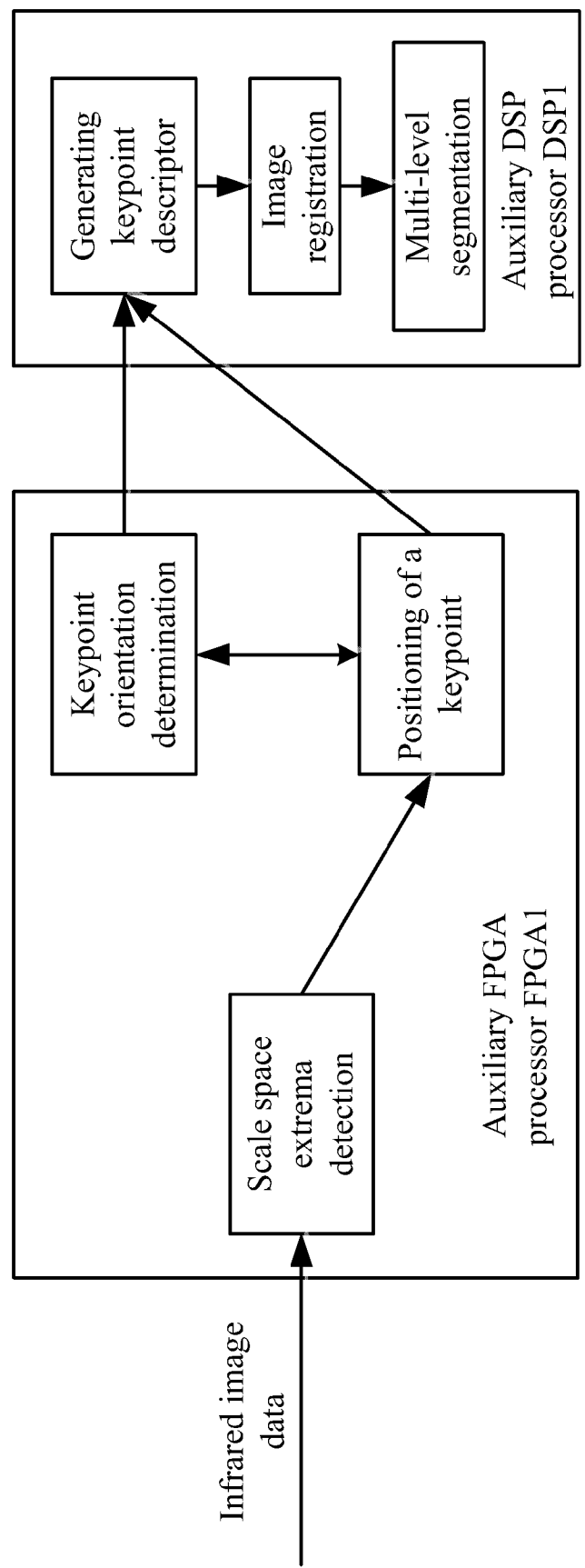
FIG. 8 is a block diagram of a SIFT feature extraction and image registration module.

2. The auxiliary DSP processor DSP1 operates to: enable SIFT feature extraction and image registration with the auxiliary FPGA processor FPGA1, as shown in FIG. 8, the image registration comprises five steps: (1) scale space extrema detection; (2) keypoint positioning; (3) orientation determination; (4) keypoint descriptor; (5) image registration. The auxiliary DSP processor DSP1 calculates the keypoint descriptor and the image registration, and transmits a keypoint descriptor vector (namely the SIFT feature that is obtained) to the main DSP processor as a target feature DSP0 for target recognition.

3. The main FPGA processor FPGA0 operates to: (1) form data transmission channels for each ASIC/SoC chip, the main DSP processor DSP0 and the auxiliary FPGA processor FPGA1; (2) conduct simple image pretreatment such as perspective transformation and window setting; (3) assist the main DSP processor DSP0 in controlling each ASIC/SoC chip. It mainly comprises eight modules: an image correction control module, an image receiving module, an image rotation control module, a perspective transformation module, an image cutting (namely window setting) module, a dynamic interconnection module, and an EMIFA (external memory interface A) address decoding module for the main DSP processor DSP0. The image correction control module image correction control module operates to configure operation parameters, bad pixel templates, background frames, and pretreatment programs of the infrared non-uniformity correction SoC chip via an asynchronous serial interface, and to parse a control instruction from the main DSP processor into a control signal required by the infrared non-uniformity correction SoC chip by controlling a state machine, thereby enabling the infrared non-uniformity correction SoC chip to enter a corresponding processing procedure. The image receiving module operates to receive an infrared image corrected and then output by the infrared non-uniformity correction SoC chip. The image rotation control module operates to control operation of the image rotation ASIC chip, to transform the control signal of the main DSP processor DSP0 into a reset and start signal during power-on, to control input of image data and parameters after the image rotation ASIC chip is enabled, and to enable the perspective transformation module after operation of the image rotation ASIC chip is complete. The perspective transformation module operates to enable a perspective transformation algorithm, in which trigonometric functions and inverse trigonometric functions are obtained via a table lookup method. The image cutting module operates to conduct window setting according to size of a window provided by the main DSP processor DSP0 and a target position of a previous frame of image under short-distance and medium-distance imaging. The dynamic interconnection module operates to dynamically allocate internal FIFO interfaces according to imaging distances provided by the main DSP processor DSP0, thereby switching between different input and output interfaces under different imaging distances. The dynamic interconnection module outputs image after perspective transformation to the auxiliary FPGA processor FPGA 1 for registration, and the auxiliary FPGA processor FPGA 1 outputs an image obtained after registration to the multi-level filtering ASIC chip under long-distance imaging, the dynamic interconnection module outputs a cut image to the auxiliary FPGA processor FPGA1 for registration, and the auxiliary FPGA processor FPGA1 outputs an image obtained after registration to the multi-level filtering ASIC chip under medium-distance imaging, the dynamic interconnection module outputs a cut image to the auxiliary FPGA processor FPGA1 for registration, and the auxiliary FPGA processor FPGA1 outputs an image obtained after registration to the connected domain labeling and profile tracing ASIC chip and the main DSP processor DSP0 under short-distance imaging. The EMIFA address decoding module operates to cooperate with the main DSP processor DSP0 for address allocation, thereby enabling data writing and reading, and parameter configuration.

4. The auxiliary FPGA processor FGPA1 operates to: enable SIFT feature extraction and image registration with the auxiliary DSP processor DSP1, and the image registration mainly comprises five steps: (1) scale space extrema detection; (2) keypoint positioning; (3) orientation determination; (4) keypoint descriptor; (5) image registration. The auxiliary FPGA processor FPGA 1 enables the scale space extrema detection, the keypoint positioning, and the orientation determination.

5. The infrared non-uniformity correction SoC chip comprises an embedded CPU and a correction ASIC core, the embedded CPU operates to enable calibration and updating of gain calibration parameters, and the correction ASIC core operates to enable real-time correction.

6. The image rotation ASIC chip operates to transform two-dimensional rotation into three-time one-dimensional translation, and to enable image rotation via a cubic convolution interpolation (namely bicubic interpolation) algorithm 7. The multi-level filtering ASIC chip operates to provide a band-pass filter for suppress background and noise based on spectral analysis on small targets, background and noise, and to adjust a bandwidth of the filter via a cascaded filtering module based on a multilevel filter algorithm thereby extracting targets with different size in the case that the targets exist.

8. The connected domain labeling and profile tracing ASIC chip operates to uniformly and uniquely label connected pixels having the same gray value in an input multi-level segmented image, based on an eight-neighborhood relationship, with natural numbers in an appearance order of the connected domain in the image from the left to the right, and from the top to the bottom, and to output a labeled image.

Operation flows of all chips will be given in details.

Figure 4:
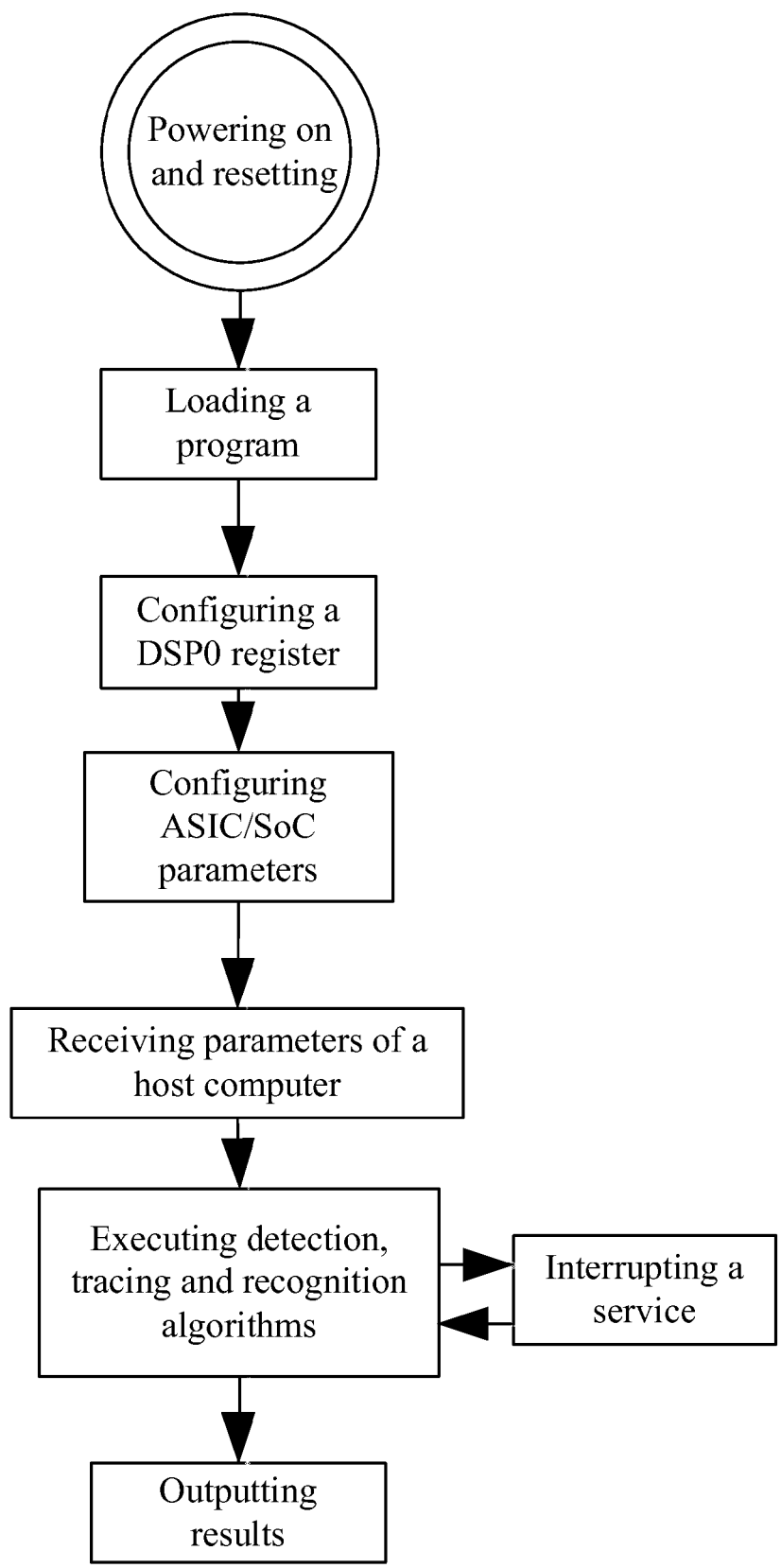
FIG. 4 illustrates operation of a main DSP processor DSP0.

1. As shown in FIG. 4, the main DSP processor DSP0 (1) is powered on and reset, and loads a handling routine from an external FLASH0, (2) configures an internal register of the main DSP processor DSP0 and an external interface control register and opens an external interrupt, (3) configures all the ASIC chips and SoC chips; (4) enters a main processing procedure, obtains flight parameters of the aircraft and determines an imaging distance, and executes detection, tracing and recognition programs; (5) responds to different interrupts in real-time and executes interrupt handling routines, (6) outputs results of detection, tracing and recognition.

2. The auxiliary FPGA processor FPGA1 is (1) powered on and loads programs, receives size of a window from the auxiliary DSP processor DSP1 to determine size of a processed image; (2) receives an image transferred from the main FPGA processor FPGA0, detects potential interest points that are invariant to scale and selection on scale space via a Gaussian derivation function, determines positions and scale of keypoints at the potential interest points, and allocates a direction to each keypoint based on a local gradient direction of the image, (3) transmits the positions and scales of the keypoints and the direction of each keypoint to the auxiliary DSP processor DSP1 for further processing.

Figure 5:
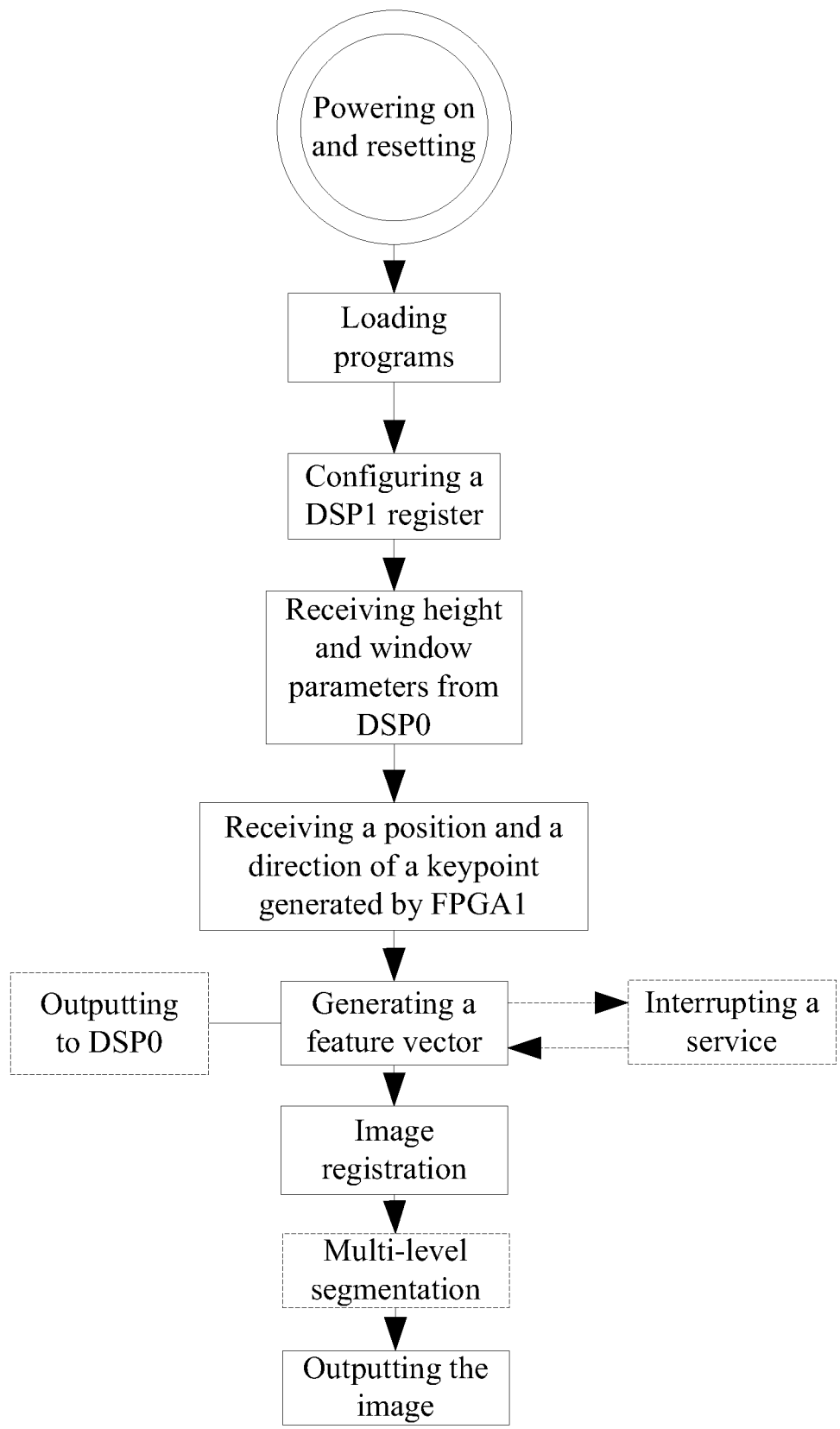
FIG. 5 illustrates operation of an auxiliary DSP processor DSP1.

3. As shown in FIG. 5, the auxiliary DSP processor DSP1 (1) is power on and reset, and receives a handling routine from an external FLASH1; (2) configures an internal register of the auxiliary DSP processor DSP1 and an external interface control register and opens an external interrupt, (3) enters a main processing procedure, receives parameters of the main DSP processor DSP0, comprising a height thereof, and size and a position of a window, generates a SIFT feature vector for image registration, and conducts image multi-level segmentation under short-distance imaging, (4) in the main process, responds to different interrupts in real-time and executes interrupt handling routines, (5) transmits the image after registration to a following processing unit via the FPGA1 and the FPGA0, and transfers the SIFT feature vector to the main DSP processor DSP0 via a serial port for target recognition under short-distance imaging.

Figure 6:
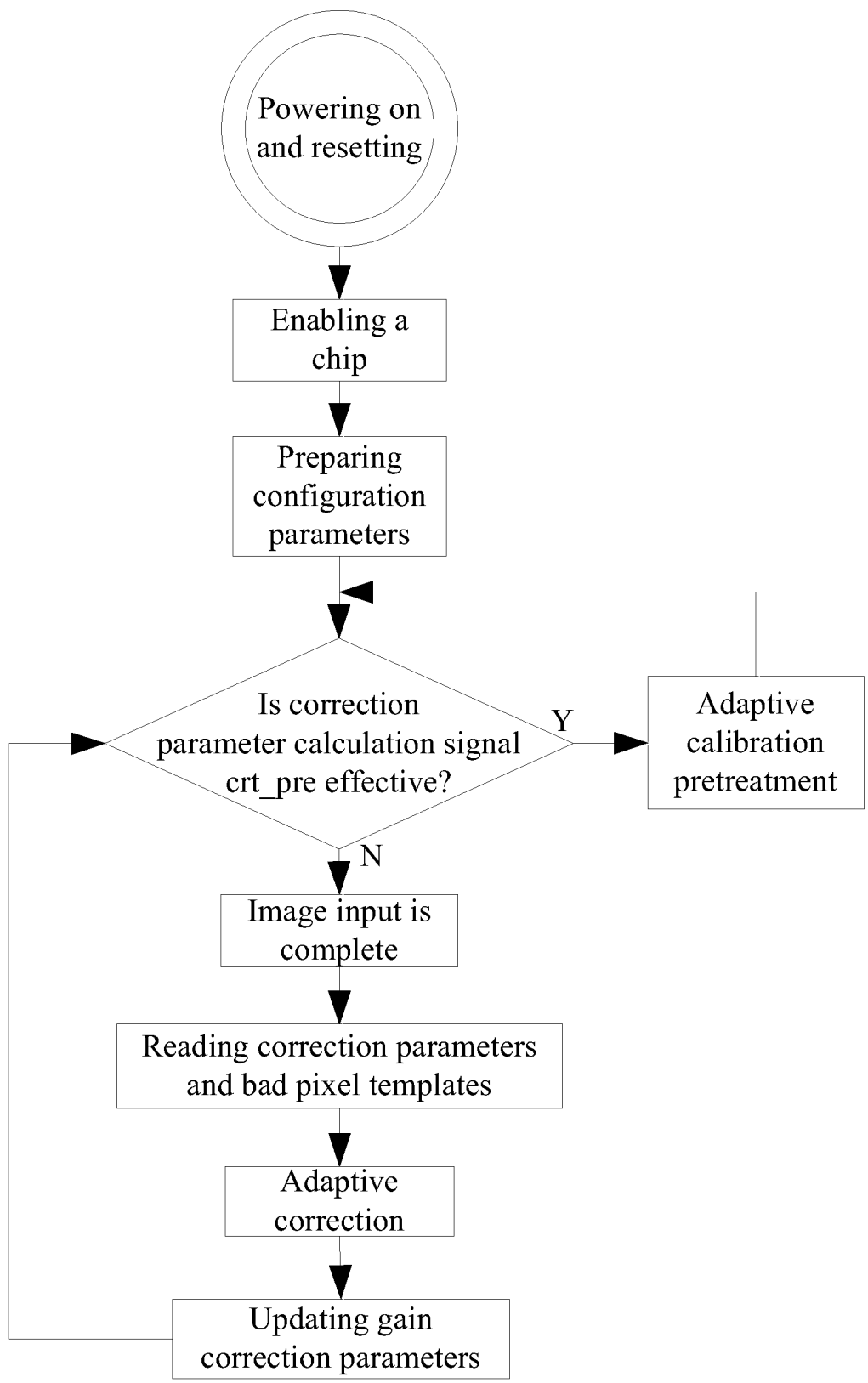
FIG. 6 illustrates operation of an infrared non-uniformity correction SoC chip.
Figure 7:
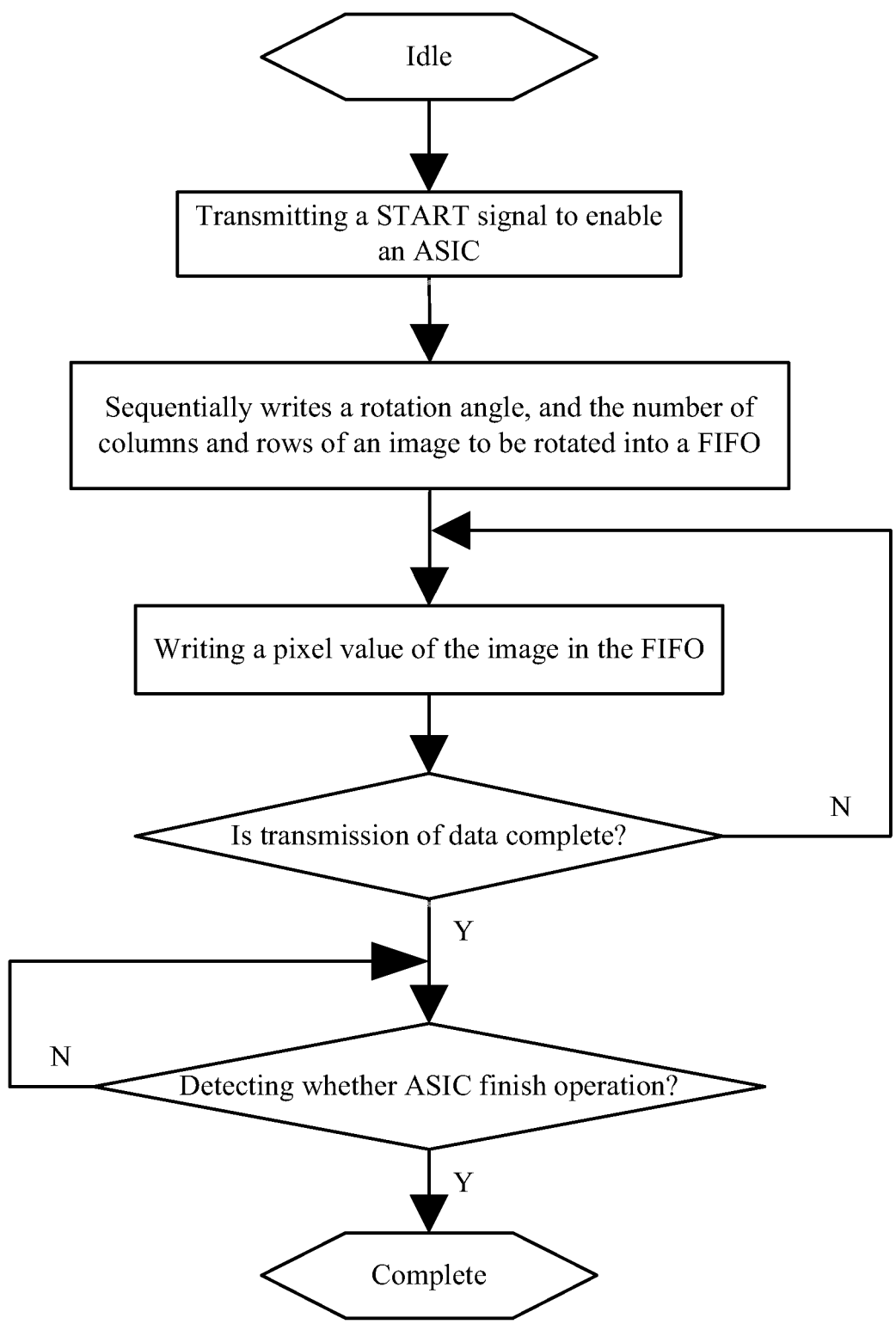
FIG. 7 illustrates operation of an image rotation ASIC chip.

4. As shown in FIG. 6, the infrared non-uniformity correction SoC chip: (1) is powered on and reset, executes a BOOT-LOADER program in a on-chip ROM, configures an interface control register therein, and reads a handling routine from an external FLASH, (2) a controller configures operation parameters, bad pixel templates, background frames, and pretreatment programs of the infrared non-uniformity correction SoC chip via an asynchronous serial interface, (3) conducts adaptive calibration or real-time correction, so that correction of an image is adaptive to variation of non-effective pixel due to scene change.

5. As shown in FIG. 8, the image rotation ASIC chip: (1) is powered on and reset, (2) then all registers recover a default state, and the ASIC chip is enabled to rotate one image, (3) sequentially writes a rotation angle, the number of columns and rows, and a pixel value of an image to be rotated into an on-chip FIFO, (4) the main FPGA processor FPGA0 detects whether a rotation complete pin is enabled, if yes, it indicates that processing of one image by the image rotation ASIC chip is completed, and a rotation result thereof is stored in a DPRAM1 of the image rotation ASIC chip, and the main FPGA processor FPGA0 can read the rotation result therefrom.

Figure 9:
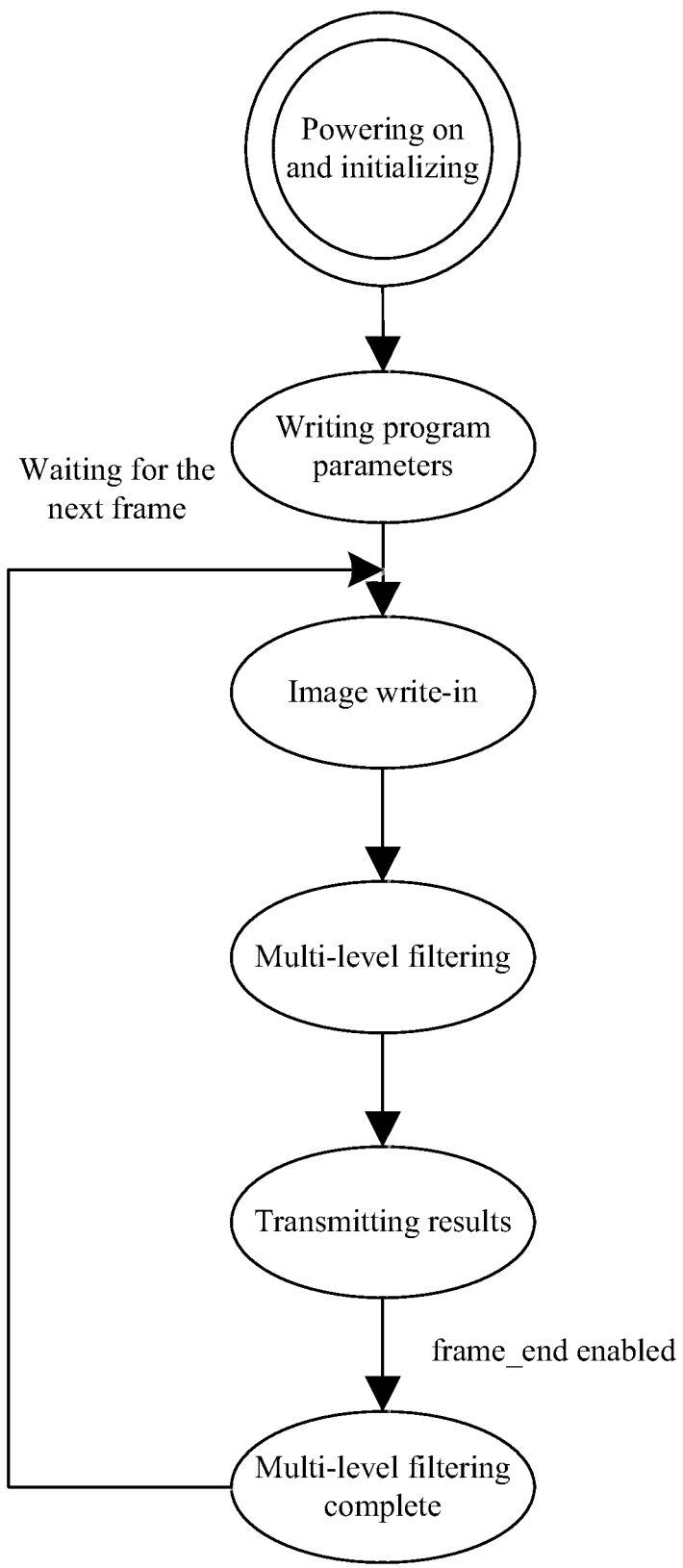
FIG. 9 illustrates operation of a multi-level filtering ASIC chip.

6. As shown in FIG. 9, the multi-level filtering ASIC chip: (1) is powered on and initialized, waits the main DSP processor DSP0 to write programming parameters comprising a length and a width of an image via an asynchronous communication module therein, and configures an address field of an external SRAM for storing output data, (2) enters a multi-level filtering state after configuration is completed, (3) receives image data, conducts multi-level filtering thereon, and sequentially transmits the filtered image data to an external DPRAM2 according to preset addresses, (4) the main DSP processor DSP0 detects whether a multi-level filtering complete pin is enabled via the main FPGA processor FPGA0, if yes, it indicates processing of one image is completed, and the controller can read a processing result in the DPRAM2.

Figure 10:
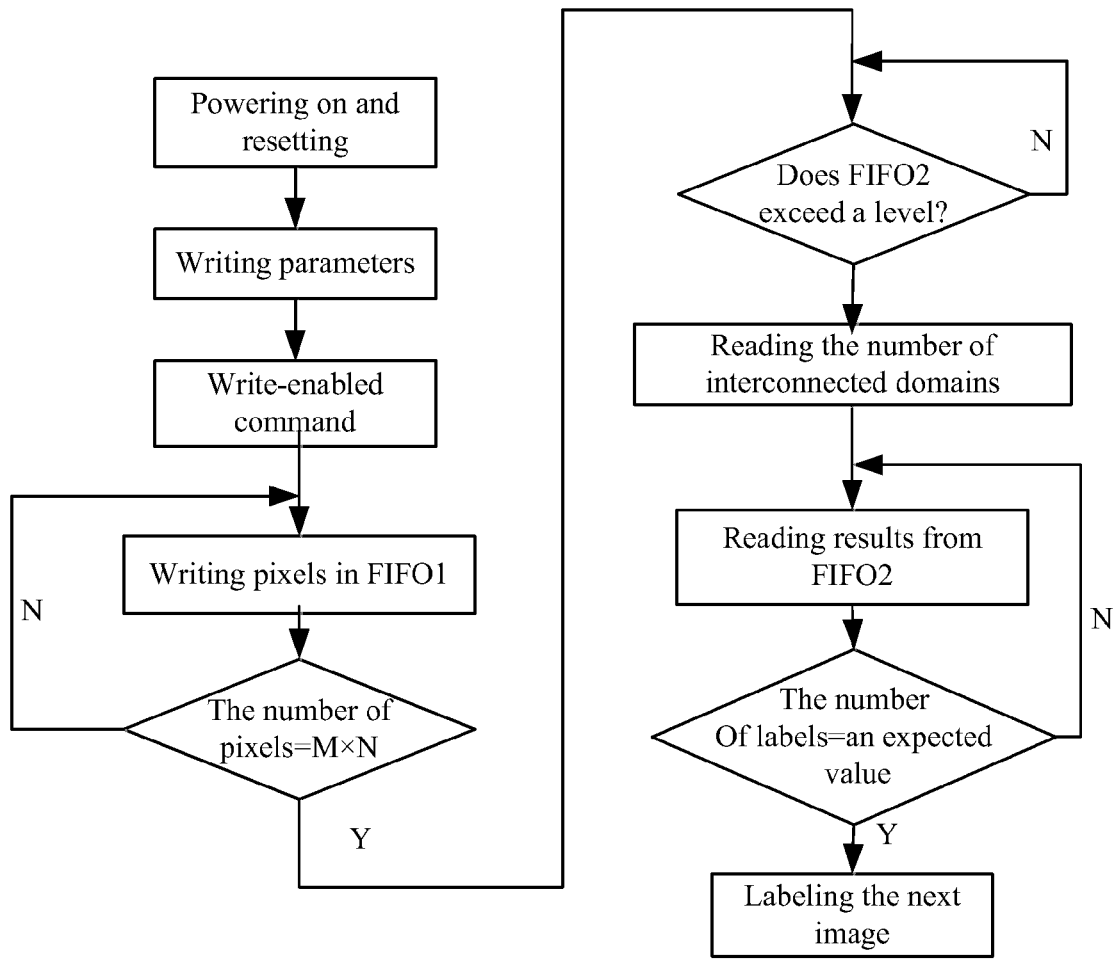
FIG. 10 illustrates operation of a connected domain labeling ASIC chip.

7. As shown in FIG. 10, the labeling ASIC chip: (1) is powered on and reset, (2) the main DSP processor DSP0 configures an internal register in the ASIC chip, and row and column parameters and control parameters of an image to be labeled via the main FPGA processor FPGA0, (3) writes a starting command in the register to enable the ASIC chip to label one image; (4) writes a pixel value of the image to be labeled in an on-chip input FIFO of the ASIC chip (assuming the image is composed of M rows and N columns, it is required to write M×N data into the input FIFO), (5) obtains the number of connected domains, and reads labeling results and connected domain feature values from an output FIFO of the ASIC chip as labeling is completed.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An aircraft-based infrared image recognition device for a ground moving target, comprising: an infrared non-uniformity correction SoC chip, an image rotation ASIC chip, a multi-level filtering ASIC chip, a connected domain labeling and profile tracing ASIC chip, a main DSP processor, an auxiliary DSP processor, a main FPGA processor, and an auxiliary FPGA processor, wherein said main DSP processor operates to control whole target detection and recognition, to enable target detection and feature recognition, to communicate with external interfaces, to receive imaging parameters from an aircraft, and to output results of detection, tracing and recognition;

said auxiliary DSP processor operates to enable SIFT feature extraction and image registration with said auxiliary FPGA processor, comprising calculating a keypoint descriptor and image registration, and transmitting a keypoint descriptor vector (namely a SIFT feature that is obtained) to said main DSP processor as a target feature for target recognition;

said main FPGA processor operates to form data transmission channels for each ASIC/SoC chip, said main DSP processor and said auxiliary FPGA processor, to conduct image pretreatment comprising perspective transformation and window setting, and to assist said main DSP processor in controlling each ASIC/SoC chip;

said auxiliary FPGA processor operates to enable SIFT feature extraction and image registration with said auxiliary DSP processor, comprising scale space extrema detection, keypoint positioning, and orientation determination;

said infrared non-uniformity correction SoC chip comprises an embedded CPU and a correction ASIC core, said embedded CPU operates to enable calibration and updating of gain calibration parameters, and said correction ASIC core operates to enable real-time correction;

said image rotation ASIC chip operates to transform two-dimensional rotation into three-time one-dimensional translation, and to enable image rotation via a cubic convolution interpolation (namely bicubic interpolation) algorithm;

said multi-level filtering ASIC chip operates to provide a band-pass filter for suppress background and noise based on spectral analysis on small targets, background and noise, and to adjust a bandwidth of said filter via a cascaded filtering module based on a multilevel filter algorithm thereby extracting targets with different size in the case that said targets exist; and said connected domain labeling and profile tracing ASIC chip operates to uniformly and uniquely label connected pixels having the same gray value in an input multi-level segmented image, based on an eight-neighborhood relationship, with natural numbers in an appearance order of said connected domain in said image from the left to the right, and from the top to the bottom, and to output a labeled image.

2. The device of claim 1, wherein
said main FPGA processor comprises an image correction control module, an image receiving module, an image rotation control module, a perspective transformation module, an image cutting (namely window setting) module, a dynamic interconnection module, and an EMIFA (external memory interface A) address decoding module of said main DSP processor;

said image correction control module operates to configure operation parameters, bad pixel templates, background frames, and pretreatment programs of said infrared non-uniformity correction SoC chip via an asynchronous serial interface, and to parse a control instruction from said main DSP processor into a control signal required by said infrared non-uniformity correction SoC chip by controlling a state machine, thereby enabling said infrared non-uniformity correction SoC chip to enter a corresponding processing procedure;

said image receiving module operates to receive an infrared image corrected and then output by said infrared non-uniformity correction SoC chip;

said image rotation control module operates to control operation of said image rotation ASIC chip, to transform said control signal of said main DSP processor into a reset and start signal during power-on, to control input of image data and parameters after said image rotation ASIC chip is enabled, and to enable said perspective transformation module after operation of said image rotation ASIC chip is complete;

said perspective transformation module operates to enable a perspective transformation algorithm, in which trigonometric functions and inverse trigonometric functions are obtained via a table lookup method;

said image cutting module operates to conduct window setting according to size of a window provided by said main DSP processor and a target position of a previous frame of image under short-distance and medium-distance imaging;

said dynamic interconnection module operates to dynamically allocate internal FIFO interfaces according to imaging distances provided by said main DSP processor, thereby switching between different input and output interfaces under different imaging distances; and said EMIFA address decoding module operates to cooperate with said main DSP processor for address allocation, thereby enabling data writing and reading, and parameter configuration.

3. The device of claim 2, wherein said dynamic interconnection module outputs image after perspective transformation to said auxiliary FPGA processor for registration, and said auxiliary FPGA processor outputs an image obtained after registration to said multi-level filtering ASIC chip under long-distance imaging;

said dynamic interconnection module outputs a cut image to said auxiliary FPGA processor for registration, and said auxiliary FPGA processor outputs an image obtained after registration to said multi-level filtering ASIC chip under medium-distance imaging; and said dynamic interconnection module outputs a cut image to said auxiliary FPGA processor for registration, and said auxiliary FPGA processor outputs an image obtained after registration to said connected domain labeling and profile tracing ASIC chip and said main DSP processor under short-distance imaging.

* * * * *